United States Patent
Takemoto

(10) Patent No.: US 7,206,445 B2
(45) Date of Patent: Apr. 17, 2007

(54) METHOD, APPARATUS AND RECORDING MEDIUM FOR IMAGE PROCESSING

(75) Inventor: Fumito Takemoto, Kaisei-machi (JP)

(73) Assignee: FujiFilm Corporation, Tokyo (JP)

( * ) Notice: Subject to any disclaimer, the term of this patent is extended or adjusted under 35 U.S.C. 154(b) by 538 days.

(21) Appl. No.: 09/748,247

(22) Filed: Dec. 27, 2000

(65) Prior Publication Data

US 2001/0005427 A1   Jun. 28, 2001

(30) Foreign Application Priority Data

Dec. 27, 1999 (JP) ............... 11-369339
Oct. 27, 2000 (JP) ............... 2000-329052

(51) Int. Cl.
*G06K 9/00* (2006.01)
(52) U.S. Cl. ..................... 382/162; 382/305
(58) Field of Classification Search ........ 382/162–167, 382/115–118, 282–283, 305, 168–170; 358/518–540; 345/589–597; 707/1–6, 104.1
See application file for complete search history.

(56) References Cited

U.S. PATENT DOCUMENTS

| | | | | |
|---|---|---|---|---|
| 5,130,935 A | * | 7/1992 | Takiguchi | ............... 382/167 |
| 5,296,945 A | | 3/1994 | Nishikawa et al. | |
| 5,333,069 A | * | 7/1994 | Spence | ............... 358/517 |
| 5,461,457 A | * | 10/1995 | Nakamura | ............... 355/77 |
| 6,035,074 A | * | 3/2000 | Fujimoto et al. | ............... 382/282 |
| 6,343,141 B1 | * | 1/2002 | Okada et al. | ............... 382/118 |
| 6,463,172 B1 | * | 10/2002 | Yoshimura | ............... 382/162 |

FOREIGN PATENT DOCUMENTS

| | | |
|---|---|---|
| JP | A8221546 | 8/1996 |
| JP | B2-2878855 | 1/1999 |
| JP | 409172553 A * | 6/2004 |
| WO | 98/56167 A1 | 12/1998 |

OTHER PUBLICATIONS

"Photoshop for Windows," Tsinghua University Press, 1996.

* cited by examiner

*Primary Examiner*—Ishrat Sherali
(74) *Attorney, Agent, or Firm*—Birch, Stewart, Kolasch & Birch, LLP

(57) ABSTRACT

A color and a tone of an image object included in an image are changed to a color and a tone desired by a user. A storage means stores reference image data representing reference images of different colors and tones, and the user selects a target image having a desired color and tone from among the reference images displayed on a monitor. Image data of an image including an image of an object is input to the image processing means and displayed on the monitor. The user views the image displayed on the monitor and specifies an area including an image of an object whose color-tone is to be changed to the color-tone of the target image. The image processing means extracts a color area from the specified area and generates cumulative histograms of the target image and the color area as characteristic quantitative data representing the color and the tone thereof. Based on the cumulative histograms, the color and the tone of the specified area are changed to become the color and the tone of the target image, and processed image data whose color and tone have been changed is obtained.

30 Claims, 8 Drawing Sheets

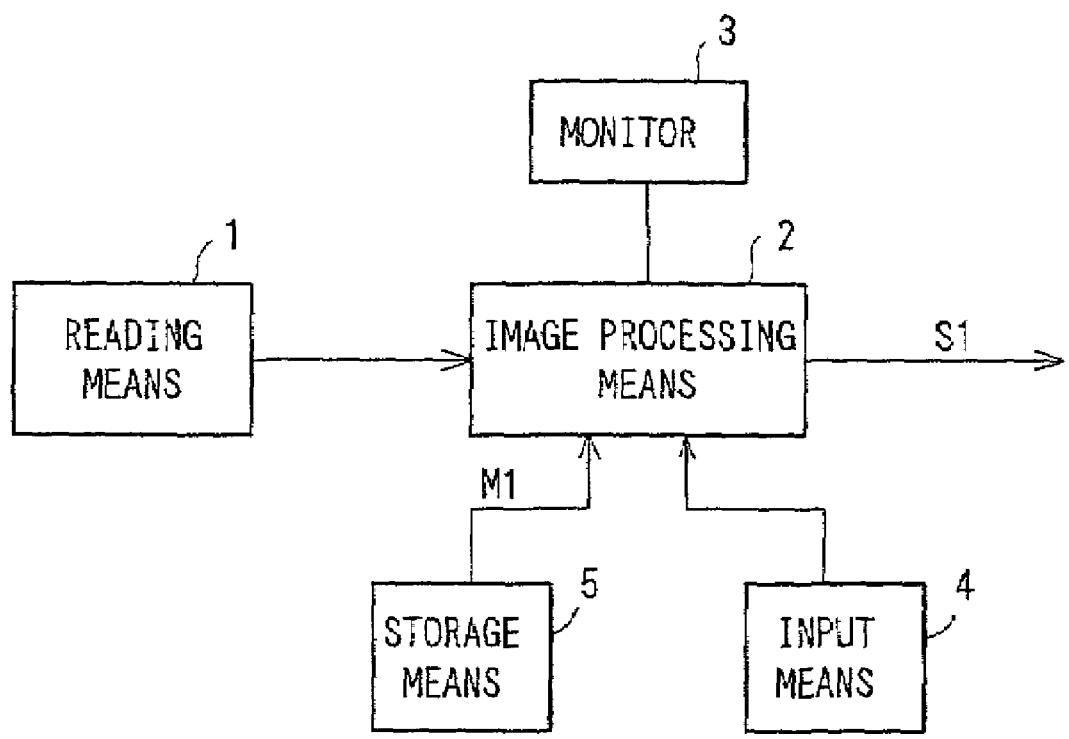
F I G. 1

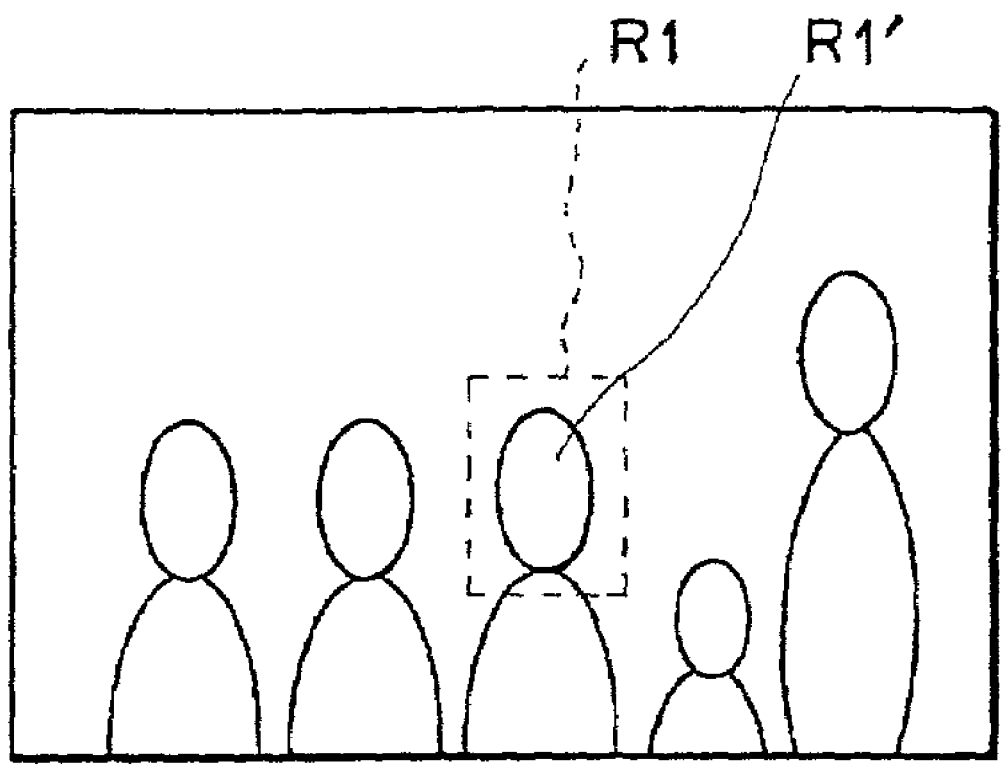
F I G . 4

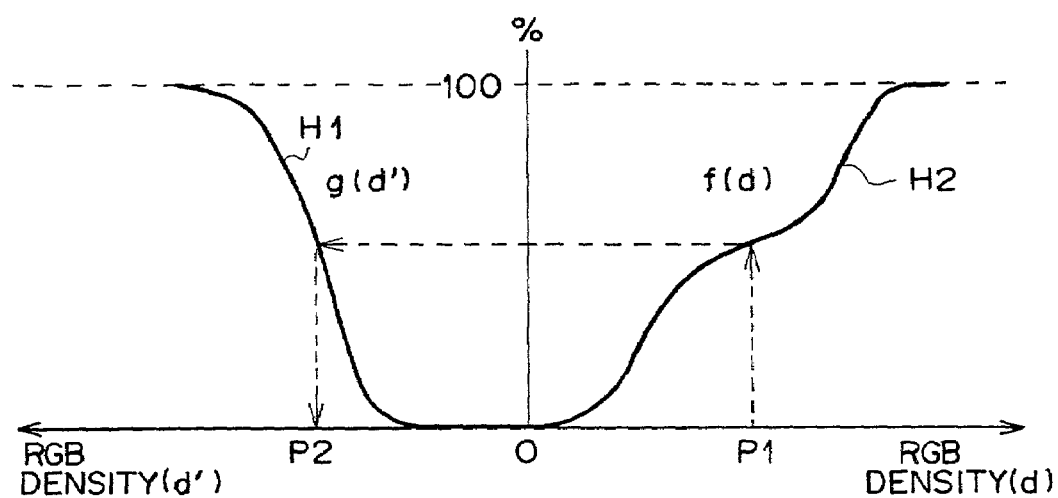
F I G. 6

METHOD, APPARATUS AND RECORDING MEDIUM FOR IMAGE PROCESSING

BACKGROUND OF THE INVENTION

1. Field of the Invention

The present invention relates to an image processing method and an image processing apparatus for changing a color and a tone in a specific area included in a color image. The present invention also relates to a computer-readable recording medium storing a program to cause a computer to execute the image processing method.

2. Description of the Related Art

Reproduction of digital image data obtained by digital still cameras (hereinafter referred to as a digital camera) and digital image data obtained by reading images recorded on film has been carried out to generate hard copies such as prints, or soft copies on display screens. In such reproduction of digital image data, a reproduced image is expected to have as high a quality as a photograph printed from a film negative.

Color reproducibility of the same person's face can vary between prints. Furthermore, in an image including a plurality of people, color reproducibility of each person's face can be different, depending on the intensity or position of a light source. In the case of an image including a person obtained by photographing, the face of the person attracts the most attention. In order to generate a high-quality photograph, correction of the face so as to have an adequate skin color is necessary. To accomplish this, various methods of changing a skin color of an image to a preferable skin color, for example by using a display means such as a monitor and a mouse have been developed. One such method comprises the steps of using a mouse to extract pixels of skin color from an image including a person's face and changing the skin color value to a color and tone of a predefined preferable skin color value using the extracted color value as reference (Japanese Patent No. 2878855, for example). A second proposed method comprises the steps of specifying an area of color to be changed contained within a displayed image, specifying the color nearest to the most preferable color for the area in which the change is desired, upon which the color of the area is changed to a pre-defined color (Japanese Unexamined Patent Publication No. 8(1996)-221546). Furthermore, in a third proposed method, the areas containing human faces are automatically extracted and the color of the areas containing faces is changed to a predefined color.

However, in all the methods described above, because the skin color of a human face is changed to a predetermined skin color, the human face does not necessarily have a preferable skin color after the change. Furthermore, since only the face color is changed, a sharp-contrast face of a person in an image obtained by photographing outdoors in sunny weather cannot be corrected.

SUMMARY OF THE INVENTION

The present invention has been conceived in consideration of the above described problems. An object of the present invention is therefore to provide an image processing method and an image processing apparatus which can change a specific area in an image such as a human face to a preferable color and tone (hereinafter, the color and tone are together referred to as the color-tone), and to provide a computer-readable recording medium storing a program to cause a computer to execute the image processing method.

An image processing method of the present invention comprises the steps of:

receiving selection of a target image having a desired color-tone from a plurality of reference images each having a different color-tone;

receiving specification of an area in an image displayed; and changing a color-tone of a desired area including the specified area to the color-tone of the target image.

The "area" refers to an area whose color-tone is to be changed in the displayed image. More specifically, the area refers to an area including an image of an object such as a human face, the sky, or green foliage.

The "desired area including the specified area" can refer to not only the entire specified area but also a specific area in the specified area, the entire image including the specified area, or areas comprising the specified area and another area.

The selection of the target image may precede the specification of the area, or vice versa.

"Reference images" refer to sample images of an object whose color-tone has been changed, such as a human face, the sky, or green leaves, for example. The plurality of reference images each having a different color-tone are provided so as to enable a user to select the desired color-tone therefrom. One of the reference images having the color-tone desired by the user is selected as the target image.

The reference images may be generated in advance according to a predetermined image of a user's preference. For a case in which the reference images are images of human faces, for example, image data containing an image of the face of a user's favorite celebrity, for example, obtained by photographing using a digital camera, by reading a film or an image with a scanner, or by other means is then subjected to processing causing various changes in the color and tone of the image of the face, and thereby generating the plurality of reference images each having a different color and tone.

An image processing apparatus of the present invention comprises:

storage means for storing a plurality of reference images each having a different color-tone;

display means for displaying an image and the reference images;

selection means for selecting from among the reference images a target image having a desired color-tone;

area specification means for specifying an area in the image displayed on the display means; and conversion means for changing a color-tone of a desired area including the specified area to the color-tone of the target image.

The image processing apparatus of the present invention may further comprise reference image generation means for generating the plurality of reference images based on a predetermined image of a user's preference.

The image processing method of the present invention may be provided as a program stored in a computer-readable recording medium to cause a computer to execute the image processing method.

According to the present invention, the target image having a desired color-tone is selected from among the reference images, which each have a different color-tone, and an area in which the color-tone is to be changed is specified in the displayed image. The color-tone of the desired area including the specified area is then changed to the color-tone of the target image. Thereby, the desired area including the specified area in the image can be changed to have the color-tone desired by the user.

Furthermore, by generating the reference images based on a predetermined image such as an image of a user's preference, selection of the target image is made enjoyable.

BRIEF DESCRIPTION OF THE DRAWINGS

FIG. 1 is a block diagram showing a configuration of an image processing apparatus according to an embodiment of the present invention;

FIG. 4 shows an image in which an area R1 has been specified;

FIG. 6 shows cumulative histograms;

DESCRIPTION OF THE PREFERRED EMBODIMENT

Figure 2:
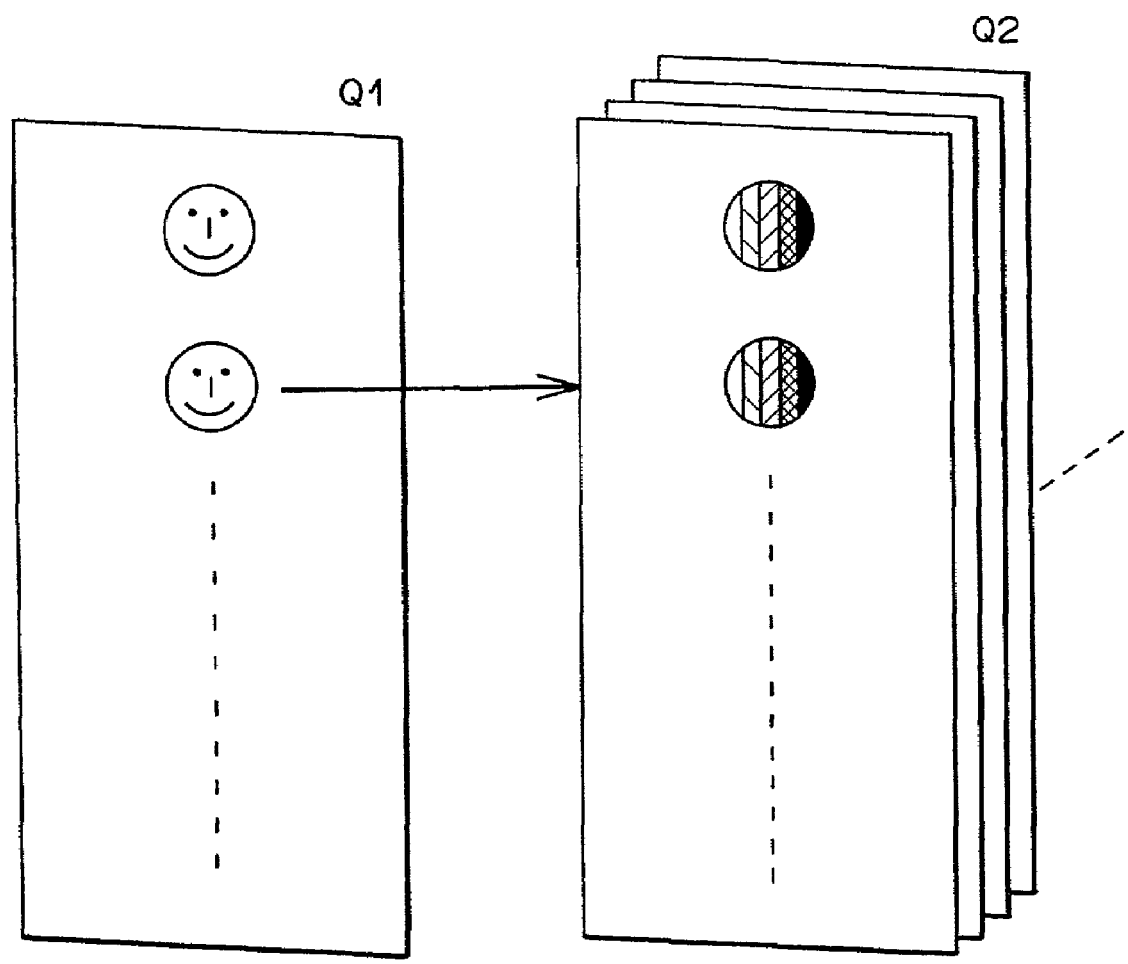
FIG. 2 shows reference images.

Hereinafter, an embodiment of the present invention will be explained with reference to the accompanying drawings.

FIG. 1 is a block diagram showing a configuration of an image processing apparatus according to an embodiment of the present invention. The image processing apparatus obtains processed image data S1 by carrying out image processing on image data S obtained by photographing using a digital camera, reading an image with a scanner, or another means. As shown in FIG. 1, the image processing apparatus comprises reading means 1 for reading the image data S from a recording medium or for reading the image data S transferred via a network, image processing means 2 for carrying out the image processing on the image data S, a monitor 3 for displaying the image data S, input means 4 comprising a mouse and a keyboard for carrying out various input operations to the image processing means 2, and storage means 5 for storing reference image data representing a plurality of reference images which will be explained later. In this embodiment, an image represented by the image data S includes a human face, and a color-tone of the face in the image is changed to a preferable color-tone.

The storage means 5 stores the reference image data representing the reference images. FIG. 2 shows the reference images represented by the reference image data. As shown in FIG. 2, the reference image data comprises data Q1 representing images of the face of the same person in different colors, and data Q2 representing images of the face of the same person in different tones set for the respective face images represented by the data Q1. The data Q1 and Q2 are in a hierarchical structure. The images of the face in different colors are shown on the monitor 3 based on the data Q1. A user selects from among the images of the face one having a desired color by using the input means 4. According to the color of the selected image of the face, the images of the face in different tones, based on the data Q2 are displayed on the monitor 3. The user selects one of the images of the face having a desired tone by using the input means 4 and the image of the face having the desired color and tone is set as a target image. The reference image data representing the target image are input to the image processing means 2, as target image data M1.

Figure 3:
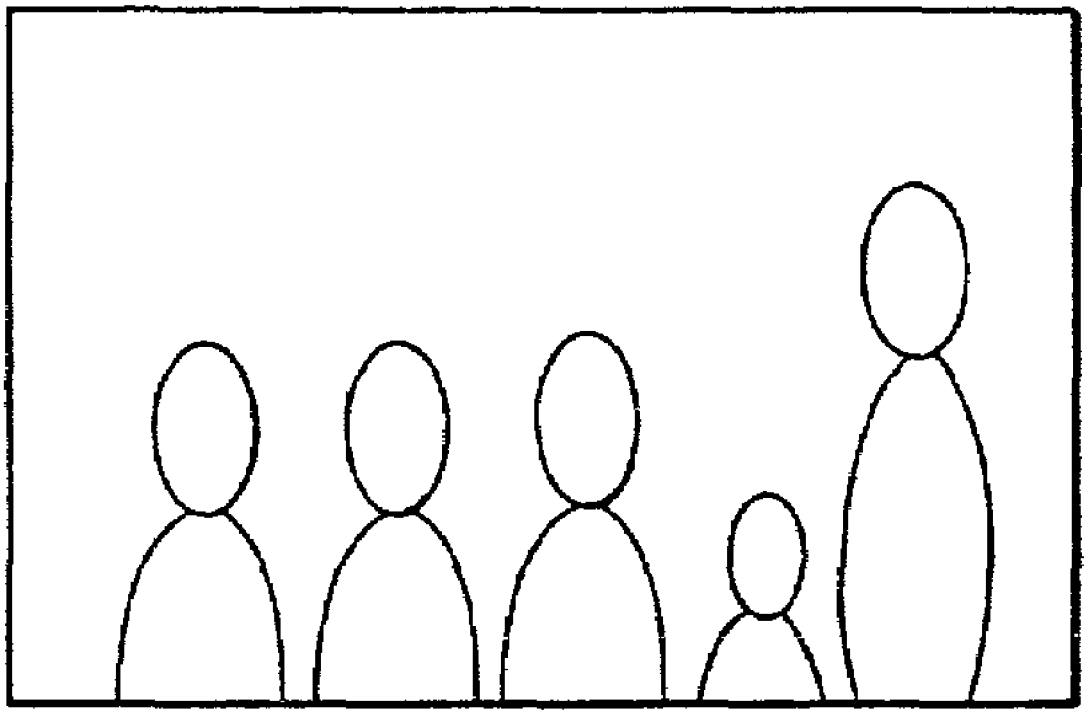
FIG. 3 shows an image displayed on a monitor.

The image processing means 2 carries out the image processing of the image data S in the following manner. First, the image data S is displayed on the monitor 3. FIG. 3 shows the image displayed on the monitor 3. As shown in FIG. 3, the image displayed on the monitor 3 includes a plurality of images of people's faces. The user views the image displayed on the monitor 3 and selects a face image whose color-tone is to be changed, by using the input means 4. FIG. 4 shows a state in which the desired face image has been selected. As shown in FIG. 4, the face image is specified by a rectangular area R1.

Figure 5:
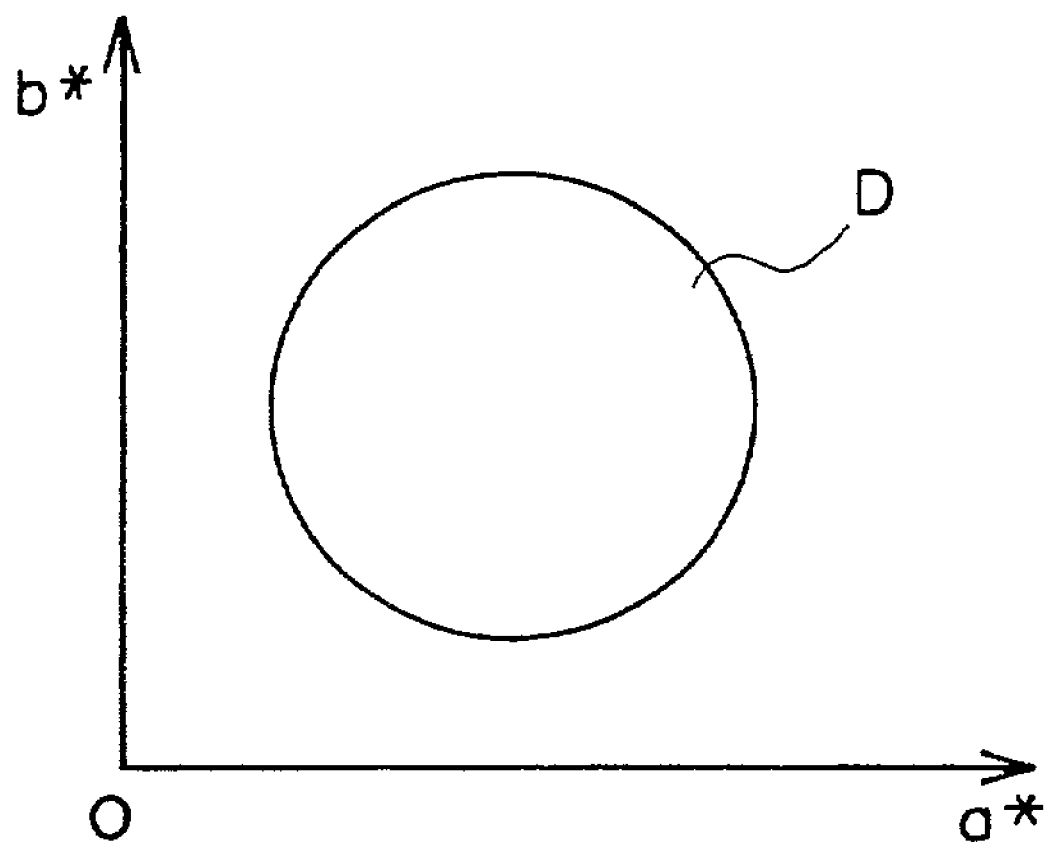
FIG. 5 is a diagram showing a skin-color range in a CIELAB color space.

After the area R1 has been specified in the above manner, the image processing means 2 extracts from the area R1 an area R1' containing pixels within a predefined skin-color range. For this extraction, a skin-color range D circled in a CIELAB color space shown in FIG. 5 is predetermined. Pixel values of the image contained in the area R1 are converted into the CIELAB space, and pixels having values within the skin-color range D are extracted as the skin-color area R1'.

After the target image has been selected and the skin-color area R1' in the area R1 has been extracted in the above manner, cumulative histograms of the target image and the skin-color area R1' are generated. FIG. 6 shows cumulative histograms H1 and H2 of the target image and the skin-color area R1', respectively. The farther the horizontal axes of the cumulative histograms go toward the left and toward the right from the origin in the cumulative histograms H1 and H2 respectively, the larger RGB densities become. For cases in which the image data S comprises data of RGB colors, the cumulative histograms H1 and H2 are generated for each color. For simplicity, one set of RGB data comprising the data of RGB colors is assumed and the cumulative histograms H1 and H2 are generated based on the RGB data. The cumulative histograms H1 and H2 represent characteristics of the color-tone of the target image and the skin-color area R1', respectively. Hereinafter, these characteristics are called characteristic quantities.

After the cumulative histograms H1 and H2 have been generated in the above manner, color-tone conversion processing to cause the color-tone of the skin-color area R1' to become the color-tone of the target image is carried out, based on the cumulative histograms H1 and H2. This color-tone conversion processing is carried out by relating the cumulative histogram H1 with the cumulative histogram H2 as shown by dashed lines in FIG. 6 so as to cause a pixel value whose RGB density is P1 in the cumulative histogram H2 to have an RGB density P2, thereby changing the color-tone of the skin-color area R1'. Let a function representing the cumulative histogram H1 be g(d') and let a function representing the cumulative histogram H2 be f(d) The processing shown by the dashed lines in FIG. 6 can be expressed by Equation (1) below:

$$d' = g^{-1}(f(d)) \qquad (1)$$

If only the color-tone of the skin-color area R1' is changed, a boundary thereof looks unnatural. Therefore, it is preferable for the color-tone to be changed gradually at the boundary.

Figure 7:
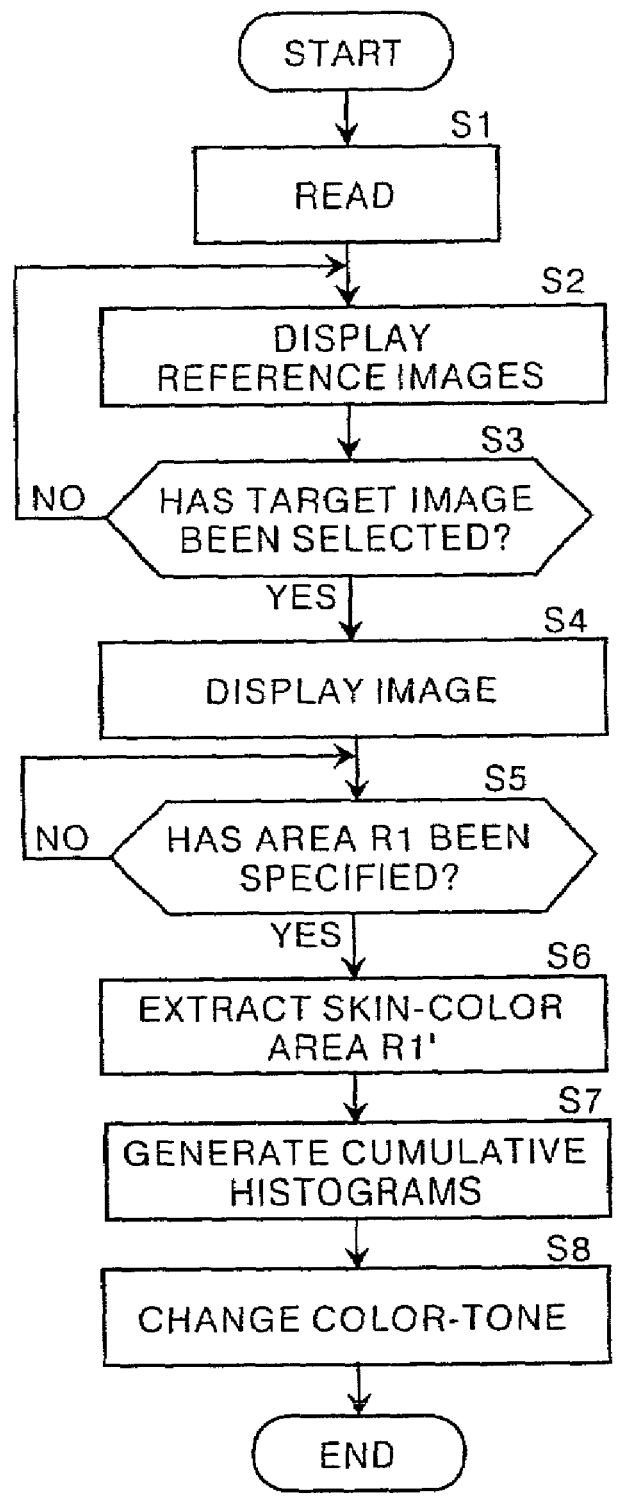
FIG. 7 is a flow chart showing operation of the embodiment.

Operation of the first embodiment will be explained next. FIG. 7 is a flow chart showing the operation of this embodiment. The image data S is read and input to the image processing means 2 (Step S1) The reference image data is read from the storage means 5 and the reference images are displayed on the monitor 3 (Step S2). The user selects the target image having the desired color-tone from the reference images and inputs completion of the selection by using the input means 4 (Step S3). After selection of target image has been completed, the image data S is displayed on the monitor 3 (Step S4).

The user views the image displayed on the monitor 3 and specifies the area R1 including the image of the face whose color-tone is to be changed to the color-tone of the target image, and inputs completion of the specification by using the input means 4 (Step S5). After selection of the area R1 has been completed, the skin-color area R1' included in the area R1 is extracted (Step S6).

After the extraction of the skin-color areas R1', the cumulative histograms H1 and H2 of the target image and the skin-color area R1' are generated (Step S7). Based on the cumulative histograms H1 and H2, the color-tone of the skin-color area R1' is changed to become the color-tone of the target image according to Equation (1), and the processed image data S1 is obtained (Step S8) to end the procedure.

As has been described above, in this embodiment, the target image having the desired color-tone is selected and the color-tone of the specified area R1 is changed to become the color-tone of the target image. Thereby, the skin-color area R1' in the specified area R1 can be changed by the user to have the color-tone desired.

In the above embodiment, the color-tone of only the skin-color area R1' in the specified area R1 is changed. However, a color-tone of the entire area R1 may be changed. Alternatively, a color-tone of a predetermined area including the area R1 or the entire image displayed on the monitor 3 may be changed.

In the above embodiment, the area R1 is specified as a rectangular area. However, the area may be specified as an area having any shape, such as the shape of a human face, for example.

In the above embodiment, characteristic quantities of the color-tone of the target image and the skin-color area R1' in the area R1 are represented by the cumulative histograms H1 and H2, which is not necessarily limited to these cumulative histograms.

In the above embodiment, the cumulative histogram H1 of the target image is generated. However, cumulative histograms of all the reference images may be generated in advance and stored in the storage means 5.

In the above embodiment, face images of one and the same person are used for the reference images. However, a plurality of face images of the same person rendered in different skin colors based on skin-color characteristics determined by race, gender or the like, so that the target image can be selected therefrom.

In the above embodiment, the color-tone is changed for the human face. However, a target image can be selected for a color of the sky, green foliage, or the like contained in an image, as in the case of the human face described above. In this case, reference images in different colors and tones for the sky, green foliage, or the like are used and a color-tone of an area R1 can be changed to a color-tone of a target image.

In the above embodiment, in selection of the target image, the desired color is first selected, and then the desired tone is selected. However, it is also possible to first select the desired tone, and then select the desired color. In this case, the images of a face in different tones are displayed on the monitor 3 and the image of the face having the desired tone is specified. The images of the face in different colors are then displayed on the monitor 3, according to the selected tone.

Figure 8:
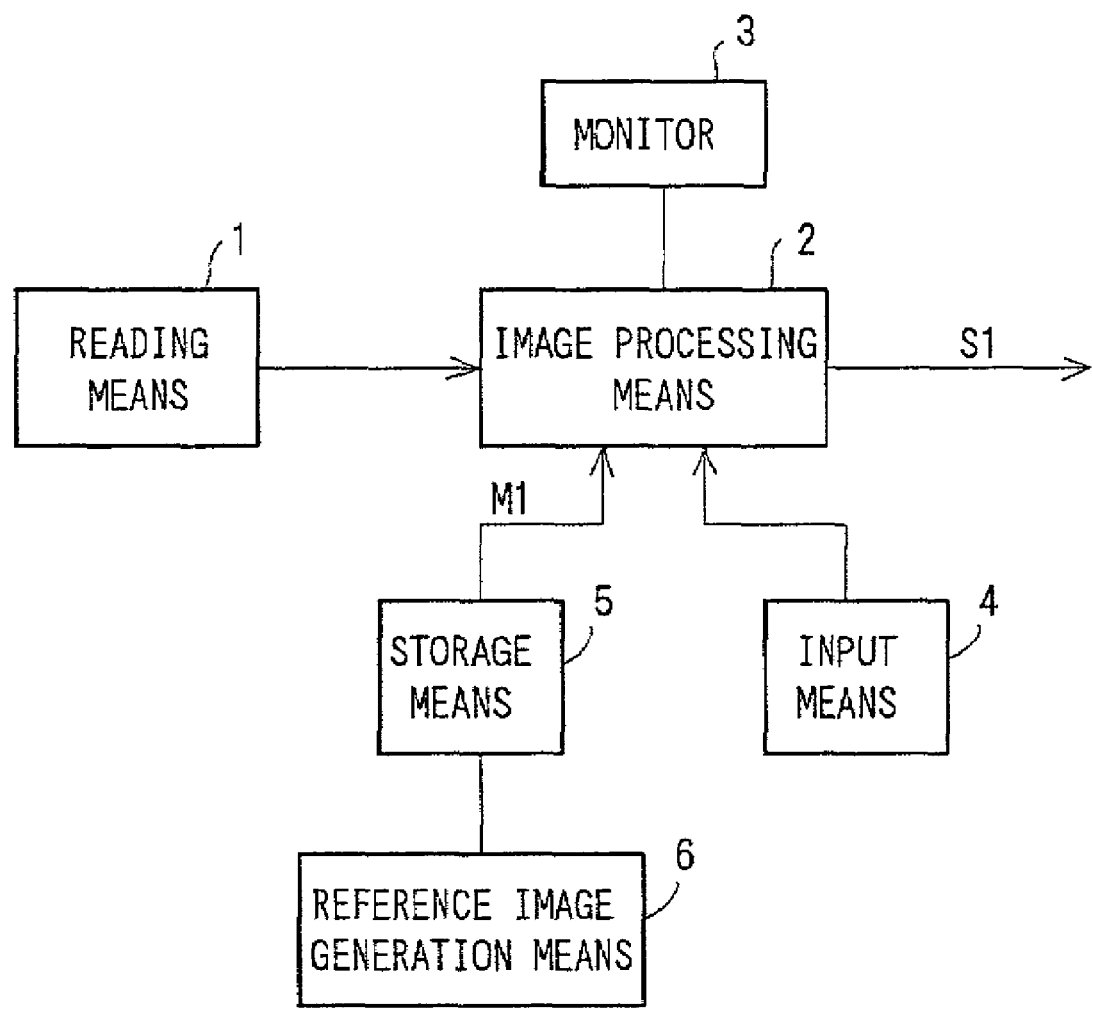
FIG. 8 is a block diagram showing a configuration of an image processing apparatus comprising reference image generation means.

The image processing apparatus according to this embodiment may further comprise reference image generation means 6 for generating the reference images, as shown in FIG. 8. The reference image generation means 6 generates the reference image data, and the reference image data is stored in the storage means 5. In this case, the reference image data is generated in the following manner. If the reference images are human faces, image data of the image of a face of a user's preference is obtained by photographing using a digital camera, reading a film or an image with a scanner, or another means. The image data is input to the reference image generation means 6. In the reference image generation means 6, a color and a tone of the image data are changed in various ways and the reference image data in different colors and tones is generated.

By generating the reference images based on a predetermined image such as a user's favorite image, selection of the target image is made enjoyable.

In addition, all of the contents of Japanese Patent Application Nos. 11(1999)-369339 and 2000-329052 are incorporated into this specification by reference.

What is claimed is:

1. An image processing method comprising the steps of:
receiving selection of a target image having a desired color-tone from a plurality of reference images, each including the same type of image, each having a different color-tone;
receiving specification of an area in an image displayed; and
changing a color-tone of a desired area including the specified area to the color-tone of the target image,
wherein the color-tone of the desired area is changed so that a cumulative histogram of the color-tone of the target image and a cumulative histogram of the color-tone of the desired area become the same,
wherein the cumulative histogram for the target image is represented by the function g(d'), where d' represents a color density value for the target image, and the desired area is changed in accordance with the equation:

$$d'=g^{-1}(f(d)),$$

where d represents a color density value for the desired area, and f(d) is a function representing the cumulative histogram for the desired area.

2. An image processing method comprising the steps of:
receiving selection of a target image having a desired color-tone from a plurality of reference images, each including the same type of image, each having a different color-tone;
receiving specification of an area in an image displayed; and
changing a color-tone of a desired area including the specified area to the color-tone of the target image,
wherein the color-tone of the desired area is changed so that a cumulative histogram of the color-tone of the target image and a cumulative histogram of the color-tone of the desired area become the same,
wherein the cumulative histogram for the desired area has a horizontal axis with increasing color density values and a vertical axis with increasing percentage values, such that a y-dimension value for a point on a curve representing the cumulative histogram corresponds to the percentage of pixels in the desired area having the x-dimension value for the point or a lesser x-dimension value.

3. An image processing method comprising the steps of:
  receiving selection of a target image having a desired color-tone from a plurality of reference images, each including an image of the same subject, each having a different color-tone;
  receiving specification of an area in a displayed image including an image of the same kind of subject as the subject in the target image; and
  changing a color-tone of a desired area including the specified area to the color-tone of the target image,
  wherein the color-tone of the desired area is changed so that a cumulative histogram of the color-tone of the target image and a cumulative histogram of the color-tone of the desired area become the same,
  wherein the cumulative histogram for the target image is represented by the function $g(d')$, where $d'$ represents a color density value for the target image, and the desired area is changed in accordance with the equation:

$$d'=g^{-1}(f(d)),$$

where d represents a color density value for the desired area, and $f(d)$ is a function representing the cumulative histogram for the desired area.

4. An image processing method comprising the steps of:
  receiving selection of a target image having a desired color-tone from a plurality of reference images, each including an image of the same subject, each having a different color-tone
  receiving specification of an area in a displayed image including an image of the same kind of subject as the subject in the target image; and
  changing a color-tone of a desired area including the specified area to the color-tone of the target image,
  wherein the color-tone of the desired area is changed so that a cumulative histogram of the color-tone of the target image and a cumulative histogram of the color-tone of the desired area become the same,
  wherein the cumulative histogram for the desired area has a horizontal axis with increasing color density values and a vertical axis with increasing percentage values, such that a y-dimension value for a point on a curve representing the cumulative histogram corresponds to the percentage of pixels in the desired area having the x-dimension value for the point or a lesser x-dimension value.

5. An image processing apparatus comprising:
  storage means for storing a plurality of reference images, each including the same type of image, each having a different color-tone;
  display means for displaying an image and the reference images;
  selection means for selecting a target image having a desired color-tone from the reference images;
  area specification means for specifying an area in the image displayed on the display means; and
  conversion means for changing a color-tone of a desired area including the specified area to the color-tone of the target image,
  wherein the color-tone of the desired area is changed so that a cumulative histogram of the color-tone of the target image and a cumulative histogram of the color-tone of the desired area become the same,
  wherein the cumulative histogram for the target image is represented by the function $g(d')$, where $d'$ represents a color density value for the target image, and the desired area is changed in accordance with the equation:

$$d'=g^{-1}(f(d)),$$

where d represents a color density value for the desired area, and $f(d)$ is a function representing the cumulative histogram for the desired area.

6. An image processing apparatus comprising:
  storage means for storing a plurality of reference images, each including the same type of image, each having a different color-tone;
  display means for displaying an image and the reference images;
  selection means for selecting a target image having a desired color-tone from the reference images;
  area specification means for specifying an area in the image displayed on the display means; and
  conversion means for changing a color-tone of a desired area including the specified area to the color-tone of the target image,
  wherein the color-tone of the desired area is changed so that a cumulative histogram of the color-tone of the target image and a cumulative histogram of the color-tone of the desired area become the same,
  wherein the cumulative histogram for the desired area has a horizontal axis with increasing color density values and a vertical axis with increasing percentage values, such that a y-dimension value for a point on a curve representing the cumulative histogram corresponds to the percentage of pixels in the desired area having the x-dimension value for the point or a lesser x-dimension value.

7. An image processing apparatus comprising:
  a target selection input receiving selection of a target image having a desired color-tone from a plurality of reference images, each including an image of the same subject, each having a different color-tone;
  an area selection input receiving specification of an area in a displayed image including an image of the same kind of subject as the subject in the target image; and
  a color-tone converter changing a color-tone of a desired area including the specified area to the color-tone of the selected target image,
  wherein the color-tone of the desired area is changed so that a cumulative histogram of the color-tone of the target image and a cumulative histogram of the color-tone of the desired area become the same,
  wherein the cumulative histogram for the target image is represented by the function $g(d')$, where $d'$ represents a color density value for the target image, and the desired area is changed in accordance with the equation:

$$d'=g^{-1}(f(d)),$$

where d represents a color density value for the desired area, and $f(d)$ is a function representing the cumulative histogram for the desired area.

8. An image processing apparatus comprising:
  a target selection input receiving selection of a target image having a desired color-tone from a plurality of reference images, each including an image of the same subject, each having a different color-tone;
  an area selection input receiving specification of an area in a displayed image including an image of the same kind of subject as the subject in the target image; and
  a color-tone converter changing a color-tone of a desired area including the specified area to the color-tone of the selected target image,
  wherein the color-tone of the desired area is changed so that a cumulative histogram of the color-tone of the target image and a cumulative histogram of the color-tone of the desired area become the same, wherein the cumulative histogram for the desired area has a horizontal axis with increasing color density values and a vertical axis with increasing percentage values, such that a y-dimension value for a point on a curve representing the cumulative histogram corresponds to the percentage of pixels in the desired area having the x-dimension value for the point or a lesser x-dimension value.

9. A computer-readable recording medium storing a program to cause a computer to execute the procedures of:

receiving selection of a target image having a desired color-tone from a plurality of reference images, each including the same type of image, each having a different color-tone;

receiving specification of an area in an image displayed; and changing a color-tone of a desired area including the specified area to the color-tone of the target image, wherein the color-tone of the desired area is changed so that a cumulative histogram of the color-tone of the target image and a cumulative histogram of the color-tone of the desired area become the same, wherein the cumulative histogram for the target image is represented by the function g(d'), where d' represents a color density value for the target image, and the desired area is changed in accordance with the equation:

$$d'=g^{-1}(f(d)),$$

where d represents a color density value for the desired area, and f(d) is a function representing the cumulative histogram for the desired area.

10. A computer-readable recording medium storing a program to cause a computer to execute the procedures of:

receiving selection of a target image having a desired color-tone from a plurality of reference images, each including the same type of image, each having a different color-tone;

receiving specification of an area in an image displayed; and changing a color-tone of a desired area including the specified area to the color-tone of the target image, wherein the color-tone of the desired area is changed so that a cumulative histogram of the color-tone of the target image and a cumulative histogram of the color-tone of the desired area become the same, wherein the cumulative histogram for the desired area has a horizontal axis with increasing color density values and a vertical axis with increasing percentage values, such that a y-dimension value for a point on a curve representing the cumulative histogram corresponds to the percentage of pixels in the desired area having the x-dimension value for the point or a lesser x-dimension value.

11. A computer-readable recording medium storing a program to cause a computer to execute the procedures:

receiving selection of a target image having a desired color-tone from a plurality of reference images, each including an image of the same subject, each having a different color-tone;

receiving specification of an area in a displayed image including an image of the same kind of subject as the subject in the target image; and changing a color-tone of a desired area including the specified area to the color-tone of the target image, wherein the color-tone of the desired area is changed so that a cumulative histogram of the color-tone of the target image and a cumulative histogram of the color-tone of the desired area become the same, wherein the cumulative histogram for the target image is represented by the function g(d'), where d' represents a color density value for the target image, and the desired area is changed in accordance with the equation:

$$d'=g^{-1}(f(d)),$$

where d represents a color density value for the desired area, and f(d) is a function representing the cumulative histogram for the desired area.

12. A computer-readable recording medium storing a program to cause a computer to execute the procedures:

receiving selection of a target image having a desired color-tone from a plurality of reference images, each including an image of the same subject, each having a different color-tone;

receiving specification of an area in a displayed image including an image of the same kind of subject as the subject in the target image; and changing a color-tone of a desired area including the specified area to the color-tone of the target image, wherein the color-tone of the desired area is changed so that a cumulative histogram of the color-tone of the target image and a cumulative histogram of the color-tone of the desired area become the same, wherein the cumulative histogram for the desired area has a horizontal axis with increasing color density values and a vertical axis with increasing percentage values, such that a y-dimension value for a point on a curve representing the cumulative histogram corresponds to the percentage of pixels in the desired area having the x-dimension value for the point or a lesser x-dimension value.

13. An image processing method as defined in claim 1, further comprising the step of generating the plurality of reference images in advance based on a predetermined image before receiving the selection of the target image.

14. An image processing apparatus as defined in claim 5, further comprising reference image generation means for generating the reference images based on a predetermined image.

15. A computer-readable recoding medium as defined in claim 9, further comprising the procedure of generating the plurality of reference images in advance based on a predetermined image before receiving the selection of the target image.

16. An image processing method as defined in claim 3 further comprising the step of generating the plurality of reference images in advance, based on a predetermined image before receiving the selection of the target image.

17. An image processing method as defined in claim 3 wherein the subject is a face.

18. An image processing apparatus as defined in claim 7, further comprising:

a reference image generator for generating the plurality of reference images in advance, based on a predetermined image before receiving the selection of the target image.

19. An image processing apparatus as defined in claim 7, wherein the subject is a face.

20. A computer-readable recording medium as defined in claim 11, further comprising the step of generating the plurality of reference images in advance, based on a predetermined image before receiving the selection of the target image.

21. A computer-readable recording medium as defined in claim 11, wherein the subject is a face.

22. An image processing method as defined in claim 2, further comprising the step of generating the plurality of reference images in advance, based on a predetermined image before receiving the selection of the target image.

23. An image processing method as defined in claim 4, further comprising the step of generating the plurality of reference images in advance, based on a predetermined image before receiving the selection of the target image.

24. An image processing method as defined in claim 4, wherein the subject is a face.

25. An image processing apparatus as defined in claim 6, further comprising reference image generation means for generating the reference images based on a predetermined image.

26. An image processing apparatus as defined in claim 8, further comprising:
 a reference image generator for generating the plurality of reference images in advance, based on a predetermined image before receiving the selection of the target image.

27. An image processing apparatus according to claim 8, wherein the subject is a face.

28. A computer-readable recording medium as defined in claim 10, further comprising the procedure of generating the plurality of reference images in advance, based on a predetermined image before receiving the selection of the target image.

29. A computer-readable recording medium as defined in claim 12, further comprising the step of generating the plurality of reference images in advance, based on a predetermined image before receiving the selection of the target image.

30. A computer-readable recording medium as defined in claim 12, wherein the subject is a face.

* * * * *